United States Patent [19]

Smith

[11] 4,074,521

[45] Feb. 21, 1978

[54] FUEL CONTROL SYSTEM FOR A GAS TURBINE ENGINE

[75] Inventor: Trevor Stanley Smith, Sutton Coldfield, England

[73] Assignee: Lucas Industries Limited, Birmingham, England

[21] Appl. No.: 721,234

[22] Filed: Sept. 8, 1976

[30] Foreign Application Priority Data

Sept. 16, 1975 United Kingdom ............... 37971/75

[51] Int. Cl.² .............................................. F02C 9/08
[52] U.S. Cl. ............................ 60/39.28 R; 60/39.28 T
[58] Field of Search .................... 60/39.28 R, 39.28 T

[56] References Cited

U.S. PATENT DOCUMENTS

| | | | |
|---|---|---|---|
| 3,267,670 | 8/1966 | McCombs | 60/39.28 R |
| 3,368,349 | 2/1968 | Johnson | 60/39.28 R |
| 3,745,767 | 7/1973 | Bloom | 60/39.28 R |
| 3,782,109 | 1/1974 | Linebrink | 60/39.28 R |

Primary Examiner—Clarence R. Gordon

[57] ABSTRACT

A gas turbine engine fuel control system has a variable metering device and a throttle valve upstream of the device. The throttle valve is responsive to engine compressor delivery pressure so that fuel pressure at the metering valve inlet is a function of compressor delivery pressure. A pressure drop control device maintains pressure difference across the metering device substantially constant, so that fuel flow to the engine is a function of compressor delivery pressure.

8 Claims, 5 Drawing Figures

FUEL CONTROL SYSTEM FOR A GAS TURBINE ENGINE

This invention relates to fuel control systems for gas turbine engines.

According to the invention a fuel control system for a gas turbine engine comprises a variable metering device through which fuel flows, in use, to the engine and a throttle valve in series with said metering device, said throttle valve being responsive to an increase in the pressure at an outlet of the engine compressor to reduce fuel flow to the engine.

An embodiment of the invention will now be described by way of example only and with reference to the accompanying drawings in which.

The drawings should be read in conjunction and identical parts have been allocated corresponding numbers.

Figure 1:
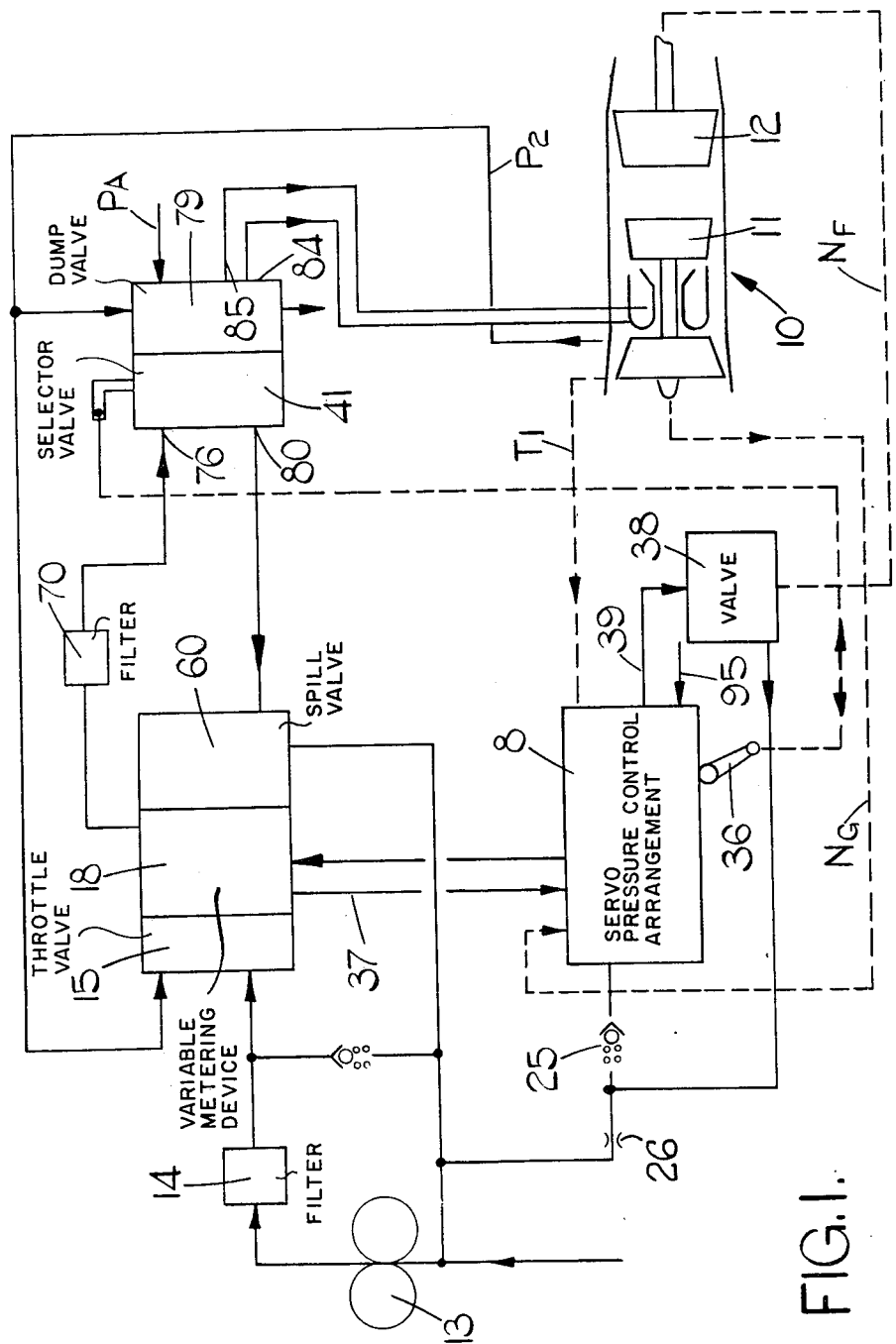
FIG. 1 is a block diagram of the system as a whole.

A gas turbine engine 10 is of the kind which incorporates a gas generator turbine 11 and a separate power turbine 12, and in the present example is considered as being intended to drive the rotor blades of a helicopter.

A pump 13 is driven from the shaft of the gas generator turbine 11 and supplies fuel via a filter 14 to the inlet of a throttle valve 15. Throttle valve 15 is shown in detail in FIG. 2 and has a closure member 16 movable by a bellows unit 17 which is responsive to the pressure P2 at the outlet of the engine compressor, whereby the fuel pressure $P2a$ immediately downstream of throttle valve 15 is a function of pressure P2.

Throttle valve 15 is in series between the pump 13 and a variable metering device 18. Device 18 has a control element 19 movable in response to an increase in a first servo pressure in a chamber 20 to increase fuel flow through the device 18. Control element 19 is urged against the pressure in chamber 20 by a spring 21 and by the pressure at the outlet of throttle valve 15. Chamber 20 is isolated from the outlet of throttle valve 15 by a rolling diaphragm element 22.

Figure 2:
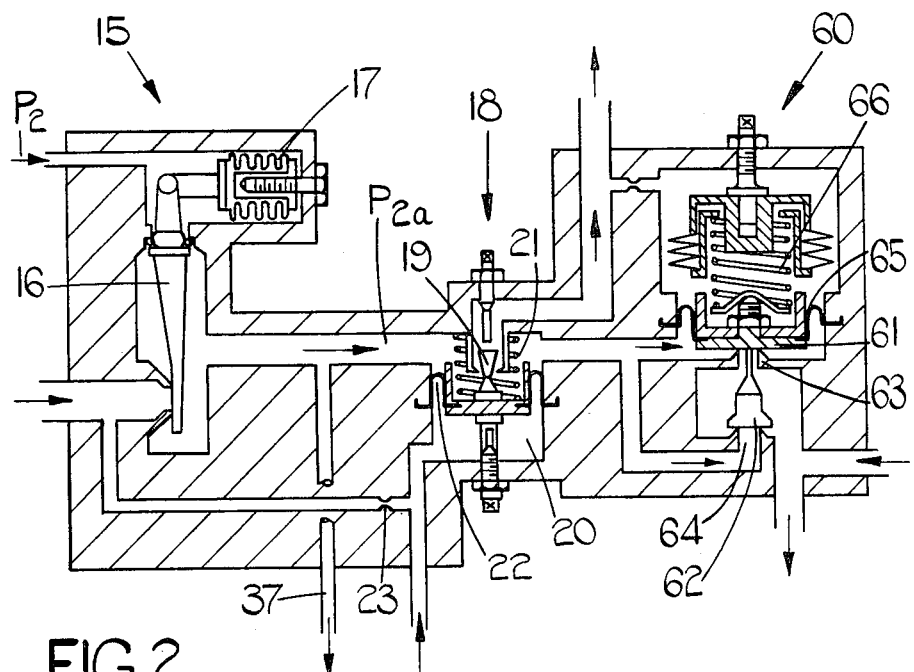
FIG. 2 shows details of the throttle valve, metering device and spill valve of the system of FIG. 1.
Figure 3:
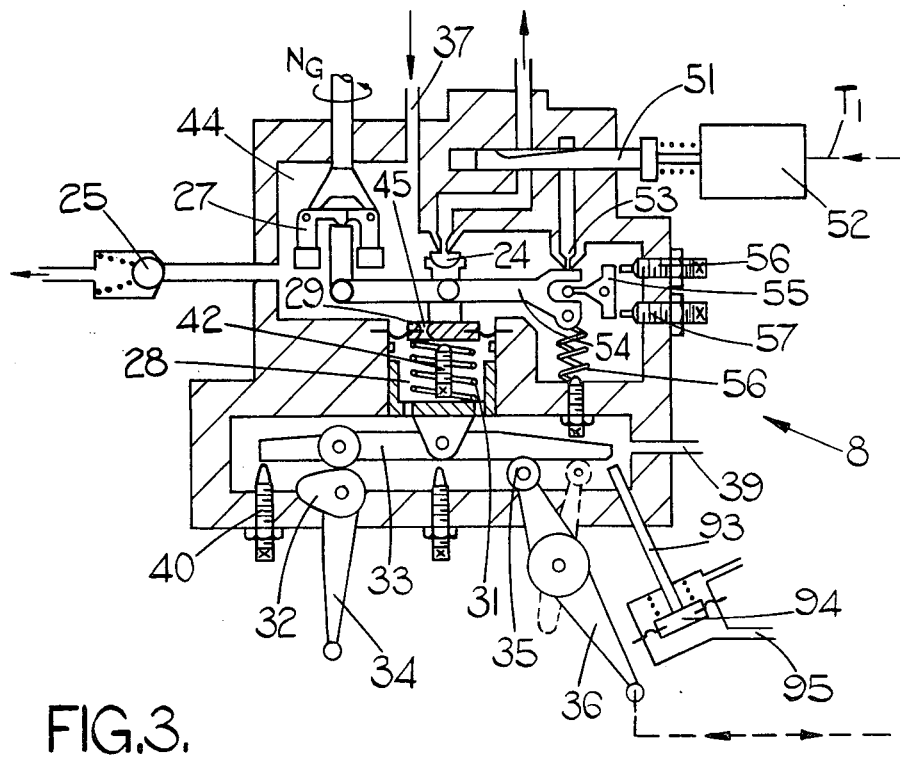
FIG. 3 shows details of the servo pressure control arrangement of the system of FIG. 1.
Figure 4:
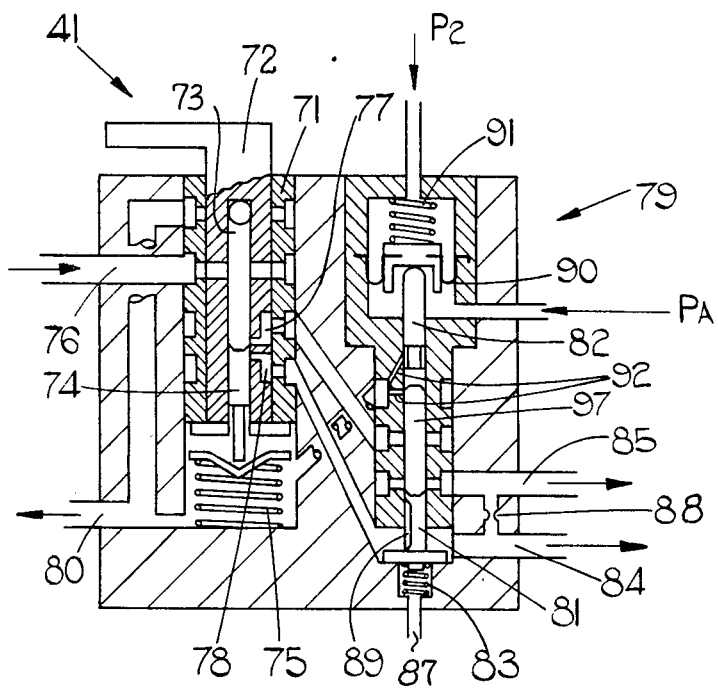
FIG. 4 shows details of the selector valve and dump of the system of FIG. 1.

The first servo pressure in chamber 20 is controlled by a servo pressure control arrangement 8, shown in detail in FIG. 3. The arrangement 8 includes a control valve 24 in series with a fixed flow restrictor 23 (FIG. 2) between the inlet and outlet of the valve 15. A non-return valve 25 and a further fixed flow restrictor 26 are connected in series between the outlet of throttle valve 15 and the upstream side of the pump 13. The chamber 20 communicates with the interconnection between restrictor 23 and valve 24, so that the servo pressure in chamber 29 can be controlled by valve 24.

Valve 24 is movable by a Govenor arrangement 27 driven at the speed NG of the gas generator turbine so that an increase in speed NG opens valve 24 to reduce the servo pressure in chamber 20.

Valve 24 is urged shut by a second servo pressure in a further chamber 28 which acts on a diaphragm arrangement 29, and also by a spring 31. The bias applied by spring 31 is variable by a cam 32 which acts on the spring 31 via a lever 33. Cam 32 is movable by a lever 34 in response to requirements to change the power output of the engine 10, a requirement for increased power compressing the spring 31 to urge valve 24 shut and consequently to move control element 19 in a direction to increase fuel flow.

A pivot point 35 of lever 33 is provided by one end of a lever 36 which is movable in a manner later to be described.

A stop 40 is adjustable so that, when the lever 34 is in a position corresponding to minimum power demand, the cam 32 no longer coacts with lever 33, which pivots about a point determined by the stop 40. In this condition the bias applied by spring 31 is determined by the position of the pivot point 35, which is in turn set by the lever 36. Lever 36 is thus operable to set a predetermined bias on spring 31, and hence a predeterminable fuel flow condition. Lever 36 is coupled to a selector valve 41, later to be described, and is operable to select the aforesaid fuel flow condition in response to a requirement for high-altitude engine idling. A further stop 42 is threadedly engaged in a relatively fixed part of the control arrangement 8 and is adjustable to set a maximum opening of the valve 24, and hence a minimum fuel flow through the metering device 18.

The zone 44 intermediate the control valve 24 and non-return valve 25 communicates with the outlet of throttle valve 15 via a line 37, and thus contains fuel at the pressure $P2a$. The zone 44 also communicates via a restricted opening 45 in the diaphragm assembly 29 with the chamber 28.

Figure 5:
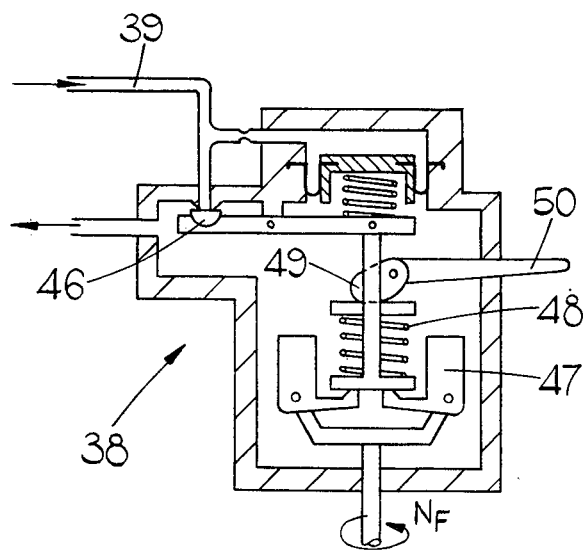
FIG. 5 shows details of the speed-responsive valve arrangement of the system of FIG. 1.

The second servo pressure in chamber 28 is controlled by a valve arrangement 38 which communicates with chamber 28 via a line 39. Valve arrangement 38 is shown in detail in FIG. 5 and includes a valve 46 which is responsive to a governor arrangement 47 driven by the power turbine 12, so that an increase in power turbine speed opens valve 46, reducing the second servo pressure in chamber 28, opening valve 24 and causing metering device 18 to reduce fuel flow to the engine. Valve 46 is urged towards an open position, by means of a spring 48 whose bias is variable by a cam 49. Cam 49 is operable by a collective pitch lever 50 for the rotor blades (not shown) of a helicopter powered by the engine 10. The arrangement is such that an increase in the collective pitch urges valve 46 shut, to cause an increase in fuel flow through metering device 18.

The servo pressure control arrangement 8 includes a valve stem 51 which is axially movable by an actuator 52 in response to variations in the temperature T1 at the inlet of the engine compressor. Valve 51 can provide a connection to a valve opening 53, in parallel with valve 24, this connection being increased in response to an increase in temperature T1.

A lever 54 is mounted for pivotal movement with respect to valve 24, one end of lever 54 coacting with the governor arrangement 27. The other end of lever 54 acts as a control element for the valve opening 53, and is also engageable with a pivot element 55. Pivot element 55 has limited movement which is controlled by stops 56, 57 respectively. Lever 54 is biased away from valve opening 53 by a spring 56 so that at lower speeds NG of the gas turbine generator the valve 51 is responsive to an increase in compressor inlet temperature T1 to provide an increased flow which by-passes the valve 24. In these conditions an increase in temperature T1 reduces the pressure in chamber 20, and hence reduces metered fuel flow. At higher speeds NG of the gas generator turbine 11 the valve opening 53 is progressively shut, so that the pressure in chamber 20 tends to rise, increasing metered fuel flow. At the same time, progressive closing of valve opening 53 causes temperature T1 to have progressively less effect on metered fuel flow.

A spill valve arrangement 60, also shown in detail in FIG. 2, includes two plate valve elements 61, 62 which move in unison and control fuel flow through respective ports 63, 64 between the upstream side of metering device 18 and the inlet of pump 13. Plate valve elements 61, 62 are movable by a rolling diaphragm seal 65 which is responsive to the pressures upstream and downstream of the metering device 18, an increase in the pressure drop across metering device 18 acting to increase spill flow through the valve arrangement 60. Plate valve elements 61, 62 are urged shut by a spring 66 whose biase is adjustable in accordance with the specific gravity of the fuel in use.

Spill valve 60 maintains the pressure drop across the metering device 18 substantially constant. Fuel flow to the engine is thus a function of the pressure P2a, and hence of compressor delivery pressure P2. During engine deceleration the adjustable stop 42 is engageable by the diaphragm arrangement 29 to limit the fall in pressure in chamber 20, and hence to limit the extent to which closure member 19 can reduce fuel flow. This limitation ensures that the minimum fuel flow through metering device 18 nevertheless remains a desired function of compressor delivery pressure P2.

The output of metering device 18 communicates via a further filter 70 with an inlet 76 of the selector valve 41, previously referred to. Valve 41 includes a ported sleeve 71 within which an axially-fixed control element 72 is rotatable. Control element 72 is coupled to the lever 36, previously described. Control element 72 has an axial bore 73 and a plurality of cross passages which can, in respective angular positions of the control element 72, connect the bore 73 with selected ones of the ports in the sleeve 71. Axially slidable within the bore 73 is a piston control element 74 which is biased against the pressure within bore 73 by a spring 75.

Piston control element 74 is responsive to an increase in pressure in bore 73 to sequentially uncover ports 77, 78 in the control element 72. Ports 77, 78 communicate via a dump valve 79 with the primary and secondary burners respectively of the engine 10.

In a first position of the control element 72, corresponding to a shut-down condition of the engine 10, the bore 73 is isolated from the inlet 76 and is connected to an outlet 80 which communicates via the spill valve arrangement 60 with the upstream side of the pump 13. In the aforesaid first position the pressure in bore 73 is therefore low and the piston control element 74 is moved by a spring 75 to shut off fuel flow to the engine.

In a second position of the control element 72, corresponding to a requirement to start the engine 10, the bore 73 is isolated from the outlet 80 and communicates with the inlet 76. The piston control element 74 then acts as a pressure-raising valve to permit fuel to flow to the ports 77, 78.

In a third position of the control element 72, corresponding to a requirement for high-level engine idling, the valve 41 acts in the same way as in the second operating position of element 72. In this position however control element 72 acts to set the lever 36 in a position which provides the required bias on spring 31, and hence sets the metering device control element 19 to its high-level idling position.

The dump valve 79 has a bore 97 within opposite ends of which piston control elements 81, 82 are slidable. Bore 97 communicates with the port 77 in valve 41, and control element 81 is biased against the pressure in bore 97 by a spring 83. Port 78 in valve 41 is permanently connected to the engine secondary burners via an outlet 84 of valve 79. Control element 81 is responsive to an increase in pressure in bore 97 to connect port 77 in valve 41 to the engine primary burners via an outlet 85 of valve 79. In this latter condition of control element 81 a flange 86 thereon isolates the outlet 84 from a low pressure damp connection 87. Outlets 84, 85 are interconnected by a flow restrictor 88. Outlets 84, 85 can also be interconnected by a recess 89 in the control element 81 when the latter has moved into a position in which it shuts off outlet 85 from port 77.

Control element 82 can be urged against the pressure in bore 97 by a rolling diaphragm arrangement 90 which is exposed on opposite sides to compressor delivery pressure P2 and atmospheric pressure PA. Diaphragm arrangement 90 is also biased by a spring 91 in a direction to urge the control element 82 against the pressure in bore 97. The effective area of the diaphragm arrangement 90 which is exposed to compressor delivery pressure P2 is eight times that of the area of control element 82 which is exposed to the pressure in bore 97. Diaphragm 90 responds to low values of compressor delivery pressure P2 to permit the control element 82 to spill fuel from bore 97 via restricted passages 92 to the upstream side of pump 13. Thus during engine starting, when pressure P2 is low, the pressure in bore 97, and hence in outlet 85 and the engine primary burners, is maintained proportional to compressor delivery pressure.

As shown in FIG. 3 the servo pressure control arrangement 8 includes a stem 93 having a diaphragm 94 responsive to a pressure signal on a line 95, an increase in this pressure signal acting to urge the stem 93 into engagement with the lever 33. The application of a pressure signal to diaphragm 94 thus causes lever 33 to increase the bias of spring 31, and thereby to cause the metering device 18 to increase fuel flow to the engine. The pressure signal on line 95 is applied in response to a demand for a boost in engine power, and in the present example is initiated by the application of water/methanol injection to the engine 10.

I claim:

1. A fuel control system for a gas turbine engine, comprising a variable metering device through which fuel flows, in use, to the engine, a throttle valve in series with said metering device, said throttle valve including means responsive to an increase in the pressure at an outlet of the engine compressor for reducing fuel flow through the throttle valve, means, responsive to a first servo pressure derived from the pressure difference across said throttle valve, for controlling said variable metering device, and means responsive to a difference between desired and actual engine speeds for varying said first servo pressure.

2. A system as claimed in claim 1 in which said first servo pressure varying means comprises a flow restrictor and a first control valve connected in series between a high pressure supply and a low pressure return, means responsive to an increase in the speed of a part of the engine, for causing said first control valve to modify said first servo pressure in a sense to cause said metering device to reduce fuel flow, and means, responsive to an increase in engine power demand, for causing said first control valve to modify said first servo pressure in a sense to increase said fuel flow.

3. A system as claimed in claim 2 which includes second and third control valves arranged in series, said series arrangement being connected in parallel with said first control valve, means responsive to variations in an engine temperature for operating said second control valve, and means, responsive to an increase in said first engine speed for causing said third control valve to reduce flow through said series arrangement, whereby the response to said servo pressure varying means to said engine temperature reduces with an increase in the speed of said first engine part.

4. A system as claimed in claim 3 which includes means operatively connecting said first and third control valves and said means resonsive to the speed of said first engine part.

5. A system as claimed in claim 2 which includes means, responsive to the speed of a second part of the engine, for generating a second servo pressure, and means, responsive to said second servo pressure, for causing said first control valve to modify said first servo pressure in a sense to cause said metering device to effect a change in fuel flow which opposes variations in the speed of said second engine part.

6. A system as claimed in claim 1 which includes regulating means for maintaining the pressure difference across said metering device substantially constant.

7. A system as claimed in claim 6 in which said regulating means comprises a spill valve having an inlet communicating with the inlet of said metering device, an outlet communicating with a low pressure zone, and a control member responsive to an increase in said pressure difference to increase spill flow.

8. A system as claimed in claim 1 which includes means, responsive to a decrease in said compressor outlet pressure or to an increase in the fuel pressure downstream of said metering device, for spilling fuel delivered by said device.

* * * * *